United States Patent [19]

DePagter et al.

[11] 4,078,618

[45] Mar. 14, 1978

[54] TORQUE CONTROLLER SHUTOFF MECHANISM

[75] Inventors: Glenn F. DePagter; Leon A. Vorst, both of Spring Lake, Mich.

[73] Assignee: Gardner-Denver Company, Dallas, Tex.

[21] Appl. No.: 666,898

[22] Filed: Mar. 15, 1976

[51] Int. Cl.² .............................................. B23Q 5/027

[52] U.S. Cl. ........................................ 173/12; 192/150

[58] Field of Search ............. 173/12; 192/150, 142 R, 192/.034

[56] References Cited

U.S. PATENT DOCUMENTS

| | | | |
|---|---|---|---|
| 3,237,742 | 3/1966 | Ulbing | 192/150 |
| 3,298,481 | 1/1967 | Schaedler et al. | 173/12 |
| 3,442,362 | 5/1969 | Bangerter | 173/12 |
| 3,450,214 | 6/1969 | Bangerter et al. | 192/150 |
| 3,610,386 | 10/1971 | Pain | 192/142 R |
| 3,616,864 | 11/1971 | Sorensen | 192/150 |
| 3,766,990 | 10/1973 | Eckman et al. | 173/12 |
| 3,792,737 | 2/1974 | Bratt | 173/12 |

*Primary Examiner*—Robert A. Hafer
*Attorney, Agent, or Firm*—Richards, Harris & Medlock

[57] ABSTRACT

A torque tool having a rotation transmitting, torque sensing, energy absorbing, non-overriding mechanism interconnecting a motor and a rotatable driven head. The mechanism includes a driven member coupled to the head and a driver coupled to the motor with the driver yieldably biased toward the driven member. The driven member has cam surfaces facing the driver engaged by bearing surfaces on the driver. The cam surfaces on the driven member permit rotation of the driver relative to the driven member and are sloped such that a preselected torque between the driven member and driver results in the rotation and translation of the driver relative to the driven member. The translation is communicated for the release of a valve rod which actuates a valve to shutoff the motor. The kinetic energy causing relative rotation after shutoff of the motor is stored and dissipated by springs.

21 Claims, 8 Drawing Figures

TORQUE CONTROLLER SHUTOFF MECHANISM

FIELD OF THE INVENTION

This invention relates to a power tool for driving a fastener and the like, and more specifically to a power tool capable of accurately torquing a fastener to a predetermined value.

THE PRIOR ART

Torque producing power tools are used extensively for driving screws and serving nuts in the assembly of machinery and like devices. Many power tools are equipped with torque sensing mechanisms which are designed to disengage the drive motor from a bit or to shut off the power supply to the bit at a preselected torque value.

Prior tools are generally of one of two types. One type of tool has a releasable clutch which operates to disengage the tool motor from the drive bit when a predetermined torque is reached. Examples of such tools are disclosed in U.S. Pat. No. 3,262,536 to R. C. Frisbie et al and U.S. Pat. No. 3,275,116 to P. W. Martin. Such tools are complex and generally necessitate numerous parts which are subject to continuous wear and breakage due to the engagement and disengagement fo the clutch mechanism. As a result, the accuracy of the torque control is short-lived, and maintenance and repair is often required.

In a second type of prior tools, a desired torque is applied to the fastener being driven by sensing the torque on the drive bit and cutting off power to the tool motor when the proper torque is reached. An example is the tool disclosed in U.S. Pat. No. 3,616,864 to Sorensen et al. This method of torquing the fastener is advantageous over the clutch type torque tools in that it eliminates the clutching mechanism and the problems and expenses associated therewith. While advantages in this respect, this second type of tools has a severe deficiencies which jeopardize the accuracy of the torque mechanism. Because the motor and associated power train remain attached to the drive bit after shut off of the motor, the kinetic energy in the rotating system tends to over torque the fastener and introduce scattered torque values from one run to the next. The additional torque cannot be predetermined because it is dependent upon the particular fastener and particular material into which the fastener is being driven. Therefore, while the second class of automatic torquing power tools eliminates problems heretofore experienced in the clutch type torquing tools, inaccuracies in the applied torque are introduced because of presence of kinetic energy.

Thus, the need has arisen for an automatic torquing power tool which eliminates the problem associated with the clutch type torque tool without introducing the inaccuracies which result from the residual kinetic energy of the motor and power train in those systems where totating bodies remain attached to the drive bit after shut off of the driving motor.

SUMMARY OF THE INVENTION

The present invention discloses an automatic torquing tool which eliminates problems associated with the clutch type torque tools by maintaining the drive motor in engagement with the drive bit throughout the operation of the tool. The present tool eliminates the inaccuracies introduced by kinetic energy in the motor and power train by use of an absorption mechanism between the motor and drive bit.

In accordance with one embodiment of the invention, a torque tool is provided with a motor and power train leading to a rotatable driven head. A torque sensing mechanism is positioned in the power train between the head and the motor and a valve rod extends from the sensing mechanism to control a start and stop valve for the motor. The tool comprises an improved energy absorbing structure including a driven motor coupled to the head and a driver coupled to the motor. The driven member has cam surfaces on its face adjacent the driver. The cam surfaces are engaged by bearing surfaces on the driver. The cam surfaces permit rotation of the driver relative to the driven member and are sloped such that a preselected relative rotation between the driven and driving members results in the movement of the valve rod and valve to shut off the motor. The cam surfaces further permit additional rotation of the driver relative to the driven member after shut off of the motor for dissipation of residual rotational energy after the motor is shut off. In this way, additional torquing forces resulting from the kinetic energy of the motor after shut off are eliminated.

In accordance with a more specific embodiment of the present invention, cam surfaces on the driven member have three distinct cam landings. Rotation of the driver is imparted to the driven member as the bearing surfaces on the driver moves across the first landing and bears against the second landing. Additionally, movement of the bearing surfaces of the driven member along the second cam landing shuts off the motor while movement of the bearing surfaces of the driver along the third cam landing dissipates the residual energy of the motor after shutoff.

In accordance with another embodiment of the present invention, the torque tool has an adjustable biasing member for yieldably biasing the driver toward the driven member. The biasing member is adjustable to control the movement of the mating surfaces of the driver along the cam surfaces of the driven member. By increasing the biasing force against the driver, a greater torque between the driver and driven member is required for rotation of the driver relative to the driven member. Thus, the torque at which the driver sufficiently rotates relative to the driven member to shut off the motor is controlled by increasing the biasing force on the driver in the direction of the driven member.

DESCRIPTION OF THE DRAWINGS

For a more complete understanding of the present invention, and for further details and advantages thereof, reference is now made to the following description taken in conjunction with the accompanying drawings in which.

DESCRIPTION OF THE PREFERRED EMBODIMENT

Figure 1:
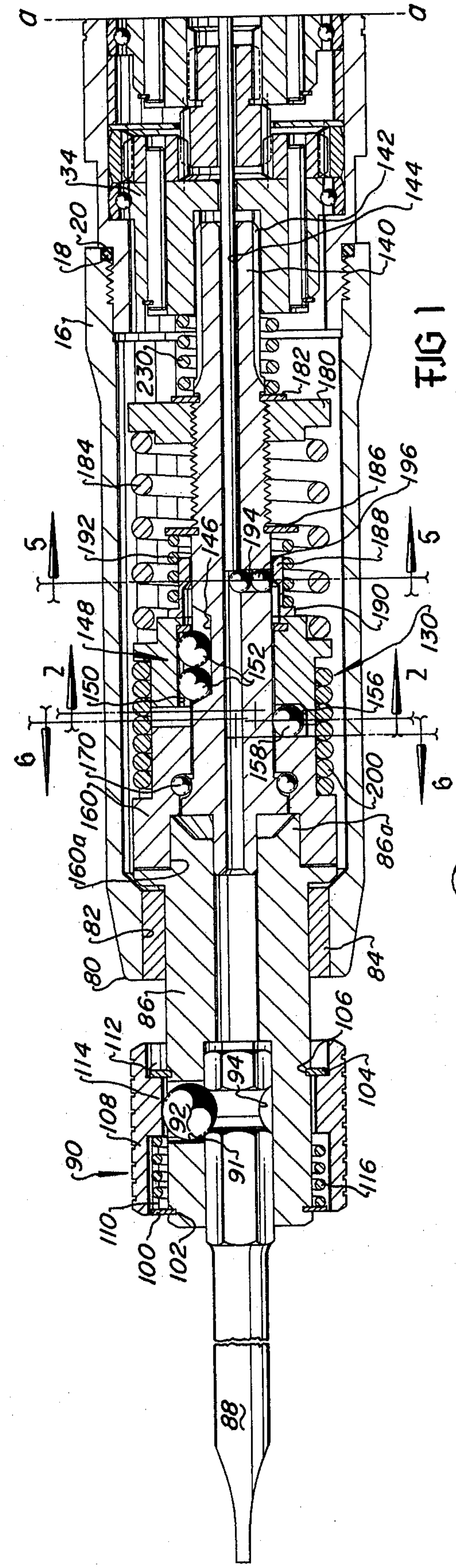
FIG. 1 is a longitudinal section view of a pressure fluid operated torque tool embodying the present invention.
Figure 1A:
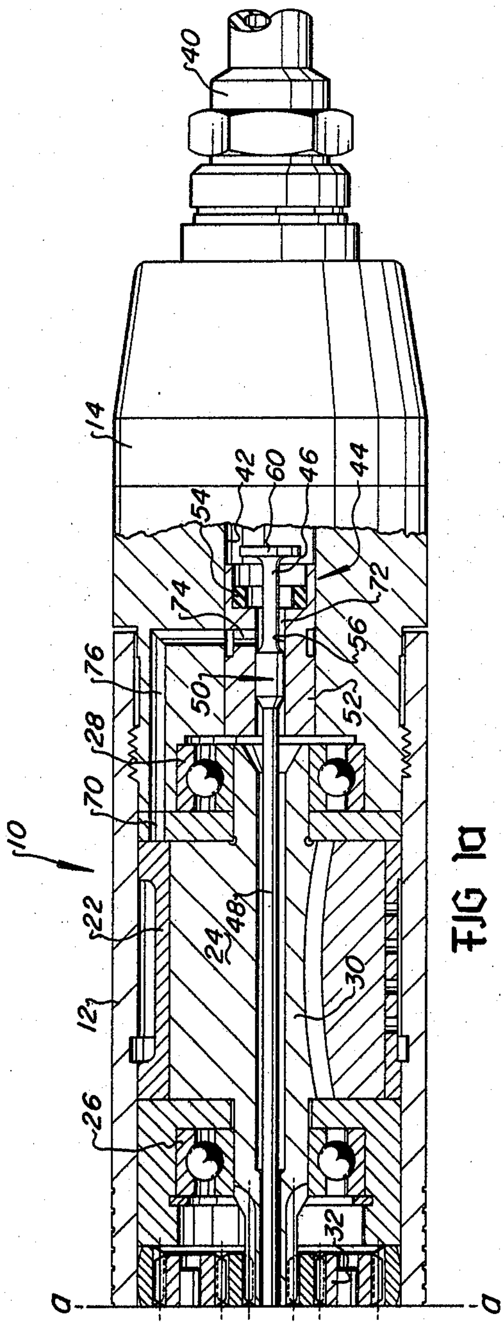
FIG. 1*a* is a continuation of FIG. 1 from line *a—a*.

Referring to FIGS. 1 and 1*a*, a fluid powered automatic torquing screwdriver 10 is illustrated. In FIG. 1*a*, screwdriver 10 includes a motor housing 12 threadedly coupled at one end to head unit 14. As may be seen in FIG. 1, the opposite end of housing 12 is similarly threadedly coupled to front cover 16. An O-ring 18 provides a seal between housing 12 and front cover 16 is positioned in an annulus 20.

Housing 12 contains a pressurized fluid operated rotary vane motor 22 of a type well known in the art. Motor 22 includes a rotor 24 journaled in bearings 26 and 28. Rotor 24 has an integral shaft 30 which drives a planetary gear speed reduction unit 32 having an output shaft formed by the planet gear carrier 34. Tool 10 is connected to a power supply, such as a source of pressure fluid (not shown), by means of a connector 40 mounted on head unit 14. Connector 40 provides fluid flow communication with a passage 42 centrally positioned in the head. A fluid shutoff valve assembly 44 is located in passage 42. Assembly 44 includes a valve closure member 46 carried by a valve stem 48 through an enlarged cylindrical guide section 50 working in a valve guide 52 which in turn has an associated valve seat 54. Valve guide 52 has a central bore 56 which mates with the guide section 50. Valve closure member 46 includes a stem which carries valve head 60. Valve seat 54 is a resilient annular ring seated within guide 52 and having an inside diameter smaller than valve head 60.

In the position illustrated in FIG. 1*a*, the head 60 is in the unseated or open position permitting the flow of fluid to a motor inlet port 70 from passage 42 by way of passages 72 and 74 in the valve guide 52 and a passage 76 in the head unit 14. Pressurized fluid supplied to motor 22 is exhausted therefrom through suitable ports (not shown).

Cover 16, FIG. 1, includes a nose 80 having a bore 82 for receiving a cylindrical bushing 84. Bushing 84 rotatably journals a spindle 86 which in turn drives a removable screw-driver bit 88 by means of a chuck assembly 90.

Spindle 86 has a longitudinal bore extending therethrough and a concentric hexagonal opening extending partially therethrough to accept the hexagonal end of tool bit 88. Spindle 86 has radial bore 91. Bore 91 is spaced to cause bit retaining ball 92 to mate with annular groove 94 axially retaining bit 88.

Spindle 86 carries a ring 100 seated in a groove 102 near the forward end of spindle 86. Spaced from ring 100 is a ring 104 seated in a groove 106. A sleeve 108 with annular recesses 112 is mounted on spindle 86. An integral internal ring 114 in sleeve 108 has inner diameter slightly larger than spindle 86. A compression spring 116 in chamber 110 bears against ring 100 and ring 114 to normally bias sleeve 108 against ring 104.

As sleeve 108 is moved forward relative to spindle 86, ball 92 is permitted to move outwardly by the insertion of bit 88. By releasing sleeve 108, ring 114 is forced against ball 92 by compression spring 116. Ball 92 becomes seated in annular groove 94, retaining bit 88. Rotation of spindle 86 is transmitted through the hexagonal matching section of bit 88.

Connected between spindle 86 and the output shaft formed by the planet gear carrier 34 is a clutch 130 for transmitting the rotation of motor 22 to bit 88, sensing the torque exerted by motor 22 on output bit 88 and shutting off the motor at a predetermined torque setting. Clutch 130 further serves to absorb the residual rotational inertia of the motor and associated drive train after the motor has been shut off in order to preserve the accuracy of the torque applied to the fastener being driven by the bit. Clutch 130 includes a shaft 140 splined by spline members 142 to planet gear carrier 34. Shaft 140 has a longitudinal bore 144 extending along the full length thereof which receives stem 48 from shutoff valve assembly 44.

Figure 4:
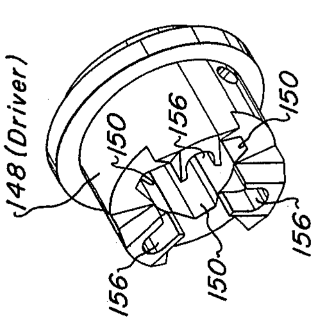
FIG. 4 is a perspective view of the driver showing the face of the driver facing the driven member.
Figure 3:
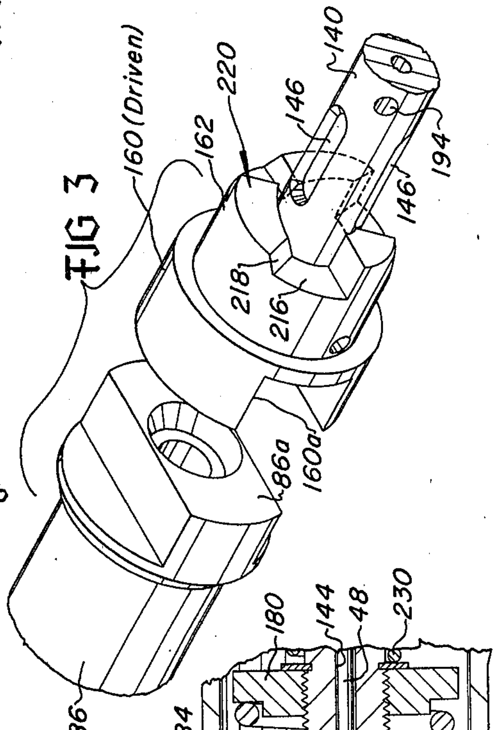
FIG. 3 is an exploded perspective view of the driven member mounted on the axis shaft and the spindle engaged therewith.
Figure 2:
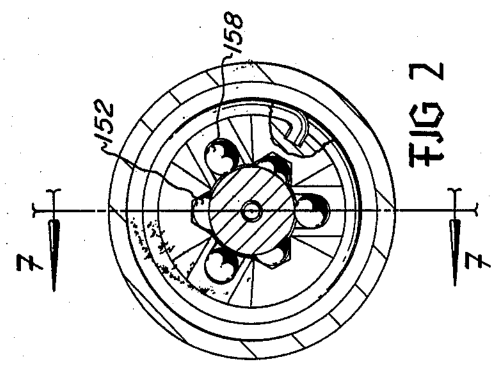
FIG. 2 is a section view taken along the line 2—2 of FIG. 1.

As is best seen in FIGS. 1 and 3, shaft 140 has three axial grooves 146 equally spaced about the circumference thereof. As is best seen in FIGS. 1 and 4, a driver 148, slides shaft 140, has three pockets 150 equally spaced about the circumference thereof to register to grooves 146 in shaft 140. In FIGS. 1 and 2, it can be seen that spline balls 152 are positioned within the longitudinal channel formed by grooves 146 and pockets 150. Thus, rotation of shaft 140 is transmitted to driver 148 through spline balls 152. However, groove 146 in shaft 140 is longer than the sum of the diameters of spline balls 152 and thus permits axial movement of driver 148 relative to shaft 140.

In FIGS. 1, 2 and 4, driver 148 has three pockets 156 equally spaced about the circumference of shaft 140. Each pocket 156 is adapted to receive one half of torque transmitting ball 158 (FIG. 1) for transmitting the rotational movement of driver 148 to bit 88 as will hereinafter be discussed in greater detail.

Adjacent driver 148 and encircling shaft 140 is a driven sleeve 160. In FIG. 3, the face of driven sleeve 160 adjacent driver 148 has a multi-contoured cam surface 162 through which the rotation of driver 148 is transmitted to bit 88.

Referring to FIG. 3 in conjunction with FIG. 1, the end of driven sleeve 160 remote from driver 148 is formed with a groove **160*a* which receives a mating tongue 86*a* extending from the end of spindle 86. Driven sleeve 160 is engaged with spindle 86 by this tongue and groove interlock so that the elements 86 and 160 rotate together. However, driven sleeve 160 must rotate relative to shaft 140 upon bearings 170** positioned therebetween.

Shaft 140 has a threaded portion which carries nut 180 adjustable axially along shaft 140 upon rotation of nut 180. A ring 182 is positioned on shaft 140 at the rearward end of the threads on shaft 140 to serve as a stop for nut 180. A compression spring 184 encircles shaft 140 between nut 180 and driver 148. Spring 184 serves to bias driver 148 toward driven sleeve 160 while simultaneously biasing torque balls 158 against cam surfaces 162 on driven sleeve 160.

A ring 186 is fixed to shaft 140 intermediate nut 180 and driver 148. A valve control sleeve 188 is positioned on shaft 140 intermediate of ring 186 and driver 148. Sleeve 188 has a flange 190. The end of sleeve 188 adjacent ring 186 is sized to closely conform to shaft 140 while the end of sleeve 188 adjacent flange 190 is bored to a larger inside diameter to provide an angular chamber between shaft 140 and that portion of sleeve 188. A compression spring 192 is positioned on shaft 140 between ring 186 and flange 190. The action of spring 192 is to bias sleeve 188 against driver 148.

Figure 5:
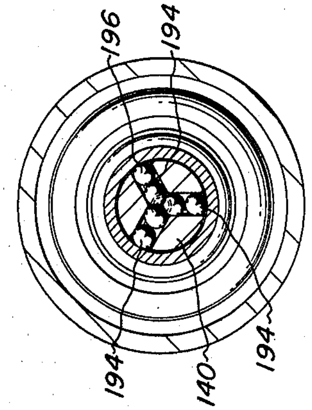
FIG. 5 is a section view taken along line 5—5 of FIG. 1.

Referring to FIGS. 1 and 5, three radial holes 194 extend through shaft 140 to provide a communication channel into bore 144 in shaft 140. Located within each hole are two stem balls 196 which are normally positioned toward the center of shaft 140 by the close contour portion of sleeve 188 when positioned over holes 194. Clutch 130 is normally biased forward in housing 16 by a compression return spring 230 which acts between ring 182 and planet gear carrier 34.

Stem 48 of shutoff valve assembly 44 is of length such that the shutoff valve assembly may be closed without stem 48 interrupting the movement of stem balls 196 into the longitudinal bore 144 of shaft 140 when clutch 130 is in its most forward position as controlled by compression spring 230. Stem 48 is also of length such that when stem balls 196 are positioned in bore 144 towards the center of shaft 140, valve head 60 may be lifted from valve seat 54 by applying an axial force to bit 88, compressing spring 230. This forces shaft 140, stem balls 196, stem 48 and thus valve head 60, rearward relative to head 14 to which valve seat 54 is attached. In this way, valve 44 is opened to permit pressure fluid to impart rotation to motor 22.

Driver 148 and sleeve 160 are further interconnected by a coil spring 200 which encircles the driver 148 and sleeve 160. Spring 200 is attached at one end to sleeve 160 and the other end to driver 148. Spring 200 is wrapped from driver 148 to driven sleeve 160 in the direction opposite the direction of rotation of driver 148. Any rotation of driver 148 relative to driven sleeve 160 increases the torsional resistance in spring 200.

Figure 6:
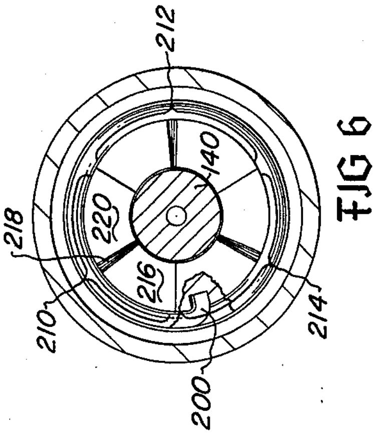
FIG. 6 is a partially cut away section view taken along line 6—6 of FIG. 1.

Referring to FIGS. 3 and 6, driven sleeve 160 is formed with a multi-contoured cam surface 162. Surface 162 consists of three identically shaped cam surfaces 210, 212 and 214. Cam surface 210 is exemplary of each of the cam surfaces 210, 212 and 214. Each cam surface has a flat landing 216 and two sloping surfaces including a fast rate riser 218 and a slow rate riser 220.

With driving fluid pressure in passage 42, valve head 60 is normally forced against seat 54. Thus valve 44 is normally closed. When shutoff, torque balls 158 rest on flat landings 216 because compression spring 184 acts on torque balls 158 through driver 148 to force balls 158 to the lowest cam position on driven sleeve 160.

When bit 88 is engaged with the fastener to be driven by an axially directed force applied to housing 12, spring 230 is compressed. As may be seen in FIGS. 1 and 1*a*, stem balls 196 are retained in bore 144 of shaft 140 by sleeve member 188 and engage the end of stem 48 causing valve head 60 to be unseated. With valve 44 open, fluid enters through passages 72 and 74 in guide 52 and passes through passage 76 and impinges vanes of motor 22. Rotation of motor 22 is transmitted through planet gear carrier 34 to shaft 140 by way of splines 142. Rotation of shaft 140 is transmitted to driver 148 by way of spline balls 152. Formed for right hand rotation, driver 148 carries nested torque balls 158 along flat landings 216 into contact with fast rate riser 218 of cam surface 210. The biasing force applied by spring 184 between nut 180 and driver 148 initially prevents movement of torque balls 158 up fast rate riser 218. Rotation of driver 148 is transmitted by way of torque balls 158 on cam surface 218 to drive sleeve 160. The rotation of sleeve 160 is transmitted directly to spindle 86 through the tongue and groove interlock and through chuck 90 to bit 88.

The drive from motor 22 continues to be transmitted through torque balls 158 until the torsional force between torque balls 158 and sleeve 160 overcomes the axial spring compression load of spring 184. When the force increases to the point that the compression load applied by spring 184 is overcome, torque balls 158 move up fast rate riser 218. This results in the axial movement of driving sleeve 148 rearwardly away from sleeve 160. Sleeve 188 moves with driver 148, compressing spring 192 as it moves. The resulting rearward movement is such that the larger internal bore of sleeve 188 comes into registration with holes 194 as torque balls 158 move upwardly on the fast rate riser 218. At this point, stem balls 196 are free to move outward from longitudinal bore 144 of shaft 140. This permits stem 48 to move forward under the fluid pressure on the valve head 60 causing the shutoff of motor 22.

The biasing force applied by spring 184 against driver 148 may be increased or decreased by selectively moving nut 180 toward or away from driver 148. Thus, by controlling the position of nut 180, the torque value at which torque balls 158 move to the top of fast rate riser 218 to shutoff motor 22 may be accurately preselected by the operator of the tool.

Subsequent to the shutoff of motor 22, torque balls 158 continue to move up slow rate riser 220 with lower but uninterrupted torque transmissions between driver 148 and sleeve 160. Though torque transmission continues, the torque transmission is substantially lowered due to the design of slow rate riser 220. The lower torque value is also accurately controllable, thus eliminating scattered and variable torque inputs heretofore introduced by the variable levels of kinetic energy in the motor and drive train. The opposing force of spring 184 increases during movement of torque balls 158 along slow rate riser 220 absorbing inertia forces of the motor. Coil spring 200 continues to be wound during this phase of the torquing cycle. Winding of spring 200 stores energy of the rotating masses within the tool and serves to nullify the unpredictable effects of variable torques on the final seating of the threaded fastener being driven.

Significant to the present invention is the fact that while the torque balls 158 are moving up slow rate riser 220, compression spring 184 is absorbing inertia forces of the motor. The energy of the motor is also being stored as a change in torque in coil spring 200 while motor rotation ceases and without erratically introducing a torquing effect to the bit, and into the fastener being driven, after shutoff of the motor.

Figure 7:
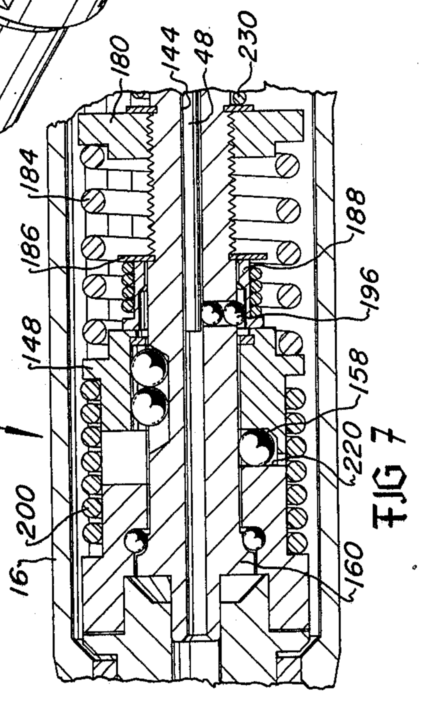
FIG. 7 is a partial longitudinal section view taken along line 7—7 of FIG. 2 and showing the relative positioning of the driver to the driven member during the torquing operation.

Referring to FIG. 7, torque balls 158 are shown positioned at the uppermost point of slow rate riser 220. It may be seen that over travel of torque balls 158 relative to cam surface 162 of driven sleeve 160 is prevented because ring 186 stops rearward movement of sleeve 188 and prevents continued rotation of driver 148 relative to driven sleeve 160 and prevents over travel of torque balls 158 past the uppermost point of slow rate riser 220.

After the fluid supply to the motor is shut off and torsional forces relieved, driver 148 and torque balls 158 are driven back down rate risers 218 and 220 by compression spring 184 and by coil spring 200 to the initial starting position. When the tool is removed from the workpiece, return spring 230 repositions the entire clutch 130. During repositioning, stem balls 196 slide or roll on stem 48 to the end of stem 48 whereupon balls 196 are repositioned inwardly in bore 144 by the action of sleeve member 188. With sleeve member 188 repositioned against driver 148, balls 196 are locked into position for the next operation.

Thus, it is seen that the present invention provides a system whereby a preselected torque force is transmitted from a fluid powered motor to a drive bit. The force is preselected by the position of nut 180 which may be knurled on the surface and accessible through an opening (not shown) in housing 16.

The tool employs a unique cam structure between a driver and driving member which serves to transmit torque from the driver to the driven member. The structure further functions to actuate a valve to shutoff the motor at a preselected torque and thereafter store kinetic energy of the motor and associated drive train which could otherwise affect the accuracy of the torque transmitted to the fastener being driven. Thus, the torque value to which the fastener is torqued may be more accurately attained by the system of the present invention. Moreover, this accuracy is achieved without the added expense and problems associated with many conventional torquing tools.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. In a torque tool having a motor and power train leading to a rotatable driven head, the improvement comprising a rotation transmitting energy absorbing clutch including:

a driven member coupled to said head;

a driver coupled to said motor, and axially slidable and coaxially rotatable both with and relative to said driven member;

a valve communicating with said driver and responsive to predetermined axial movement of said driver relative to said driven member for shutting off said motor;

a bearig surface on said driver facing said driven member; and a cam structure formed on said driven member facing said bearing surface for engagement therewith to transmit rotation of said driver to said driven member, said cam structure forcing axial movement of said driver as said driver rotates relative to said driven member to actuate said valve to shutoff said motor and absorption structure coupled between said driver and driven member operable upon continued rotation of said driver to store kinetic energy of said motor.

2. The torque tool of claim 1 further characterized by an adjustable biasing means yieldably biasing said driver toward said driven member to oppose movement of said bearing surface of said driver along said cam structure to fix the torque at which said motor is shutoff.

3. The torque tool of claim 2 wherein said cam structure on said driven member is characterized by three distinct cam landings wherein movement of said bearing surface of said driver along the second of said landings moves said driver axially from said driven member to shutoff said motor and the movement of said bearing surface along the third of said landings stores kinetic energy of said motor after shutoff.

4. The torque tool of claim 2 wherein said cam structure on said driven member is characterized by first, second and third cam landings to impart rotation of said driver to said driven member only as said bearing surface of said driving member moves across the first and second of said landings.

5. The torque tool of claim 4 wherein the movement of said bearing surface on said driver over said second cam landing causes axial movement of said driver, said second landing on said driven member being so inclined as to interrelate the axial movement between said driving and driven members to the torque being transmitted between said driving and driven members.

6. The torque tool of claim 5 wherein a coupling between said valve and said driver shuts off said motor when said bearing surface on said driver reaches the point of transition between said second and third cam landings.

7. The torque tool of claim 2 further characterized by:

resilient bias means for normally maintaining said valve closed;

a valve stem extending from said valve and normally communicating with said head;

releasable means responsive to axial movement of said driver relative to said driven member for disconnecting said stem from said head thereby permitting said bias means to close said valve at a predetermined axial movement between said driver and said driven member.

8. The torque tool of claim 6 wherein said third cam landing on said driven member is inclined for continued movement of said bearing surface over said third cam landing after shutoff of said motor and a coil spring interconnecting said driver and said driven member for wind up storage of kinetic energy of said motor after shutoff.

9. In a pneumatic torque tool having a motor and power train leading to a rotatable driven head with a torque sensing mechanism in the drive train between the head and the motor and a valve stem communicating with the sensing mechanism to control a start/stop valve for the motor, the improvement comprising an energy storage control structure including:

coaxial structure including a driven member coupled to said head; and a driver coupled to said motor; with a bearing surface on said driver facing said driven member; and 'a cam surface on said driven member facing said bearing surface, resilient means normally biasing said driver and said driven member into contact; and a coil spring interconnecting said driver and said driven member for wind up thereof upon relative rotation therebetween in the driving sense and means responsive to predetermined movement of said driver away from said driven member to shutoff said motor, thereafter storing kinetic energy of the motor in said coil spring, and as a secondary means, to return said driver to its original position after motor shut off.

10. The torque tool of claim 9 further characterized by:

means for adjusting said resilient means to control the torque at which movement of said bearing surface along said cam surface produces axial movement of said driver to cause said shutoff.

11. The torque tool of claim 9 wherein said bearing surface is characterized by:

a plurality of torque balls nested for rotation with said driver for travel along said cam surface of said driven member.

12. The torque tool of claim 10 wherein said cam surface is characterized by a first, second and third landing and said bearing surface of said driven member is positioned for imparting rotation of said driver to said driven member as said bearing surface moves across the first and up the second landing.

13. The torque tool of claim 12 wherein said first landing is in a plane substantially perpendicular to the axis of rotation of said driver and driven member and said second landing is in a plane at a different angle from said axis.

14. The torque tool of claim 13 wherein the angle formed by the plane of said second landing with said axis is smaller than the angle formed by the plane of said third landing with said axis.

15. The torque tool of claim 12 wherein release structure between said valve and said driver responds to rotation of said driver relative to said driven member as said bearing surface on said driver reaches the point of transition between said second and third cam landings to close said valve to shutoff the motor.

16. In a torque tool where a housing has a motor mounted therein, a driven member mounted coaxially with said motor and a coaxial driver mounted for movement relative to said motor to start said motor and movable relative to said driven member, the combination comprising:

an on/off control linkage extending along the axis of said motor and driver;

a translation linkage responsive to the torque generated between said driver and said driven member to shutoff said motor at a predetermined torque and to substantially free said driven member from rotational drive of said driver; and a resilient structure coupling said driver and said driven member to oppose relative rotation after said motor is shutoff and to store kinetic energy of said motor while applying low torque to said driven member.

17. The torque tool of claim 16 wherein:

a start and stop valve for said motor linked to said driver and responsive to the rotation of said driver relative to said driven member to shutoff said motor at a predetermined rotation of said driver relative to said driven member.

18. The torque tool of claim 17 wherein an adjustable biasing means yieldably biases said driver toward said driven member and provides selective control of the torque at which said motor is shutoff.

19. The torque of claim 16 wherein:

a plurality of torque balls are mounted for rotation with said driver and contact said driven member in manner to produce rotation of said driven member up to a given torque level and thereafter to move said driver axially away from said driven member to actuate said linkage to a motor shutoff state.

20. The torque tool of claim 19 wherein a cam surface having:

a first and second landing surface is formed on the face of said driven member adjacent said driver and restrains said torque balls such that the rotation of said driving member is transmitted to said driven member through said torque balls and produces axial movement of said driver at said given torque level.

21. In a torque tool having a motor and power train leading to a rotatable driven head, the improvement comprising a rotation transmitting energy absorbing clutch including:

a driven member coupled to said head;

a driver coupled to said motor, and axially slidable and coaxially rotatable both with and relative to said driven member;

a valve communicating with said driver and responsive to predetermined axial movement of said driver relative to said driven member for shutting off said motor;

a bearing surface on said driver facing said driven member; and a cam structure formed on said driven member facing said bearing surface for engagement therewith to transmit rotation of said driver to said driven member, said cam structure forcing axial movement of said driver as said driver rotates relative to said driven member to actuate said valve to shutoff said motor and absorption structure coupled between said driver and driven member operable upon continued rotation of said driver to store kinetic energy of said motor and structure for returning said driver to its original position after motor shutoff.

* * * * *

UNITED STATES PATENT OFFICE
CERTIFICATE OF CORRECTION

Patent No. 4,078,618 Dated March 14, 1978

Inventor(s) Gleen F. DePagter et al.

It is certified that error appears in the above-identified patent and that said Letters Patent are hereby corrected as shown below:

Column 1, line 27, "fo" should read -- of --.

Column 1, line 39, after "has" delete "a".

Column 1, line 59 "totating" should read -- rotating --.

Column 2, line 10, "motor" should read -- member --.

Column 3, line 16, after "16" insert "and".

Column 3, line 23, "Tool" should read -- Screwdriver --.
Column 3, line 49, "screw-driver" should read -- screwdriver --.
Column 4, line 21, after "148" delete ",".

Column 4, line 21, after "slides" insert "on".

Column 4, line 21, after "140" delete ",".

Column 4, line 21, after "140" insert "and".

Column 4, line 52, "adjustable" should read -- adjustably --.

Column 5, line 43, after "shutoff" insert "occurs".

UNITED STATES PATENT OFFICE

CERTIFICATE OF CORRECTION

Patent No. 4,078,618 Dated March 14, 1978

Inventor(s) Glenn F. DePagter et al.

It is certified that error appears in the above-identified patent and that said Letters Patent are hereby corrected as shown below:

Column 5, line 51, after "sleeve" delete "member".

Column 5, line 56, "splines" should read -- spline members --.

Column 5, line 67 "chuck" should read -- chuck assembly --.

Column 7, line 42, "bearig" should read -- bearing --.

Column 8, line 48, after "and" delete "'".

Column 8, line 48, phrase beginning "a cam surface...." should be moved to next line.

Column 9, line 46, after "valve" insert "is provided".

Column 10. line 7 after "torque" insert "tool".

Signed and Sealed this

*Seventeenth* Day of *October 1978*

[SEAL]

*Attest:*

RUTH C. MASON
*Attesting Officer*

DONALD W. BANNER
*Commissioner of Patents and Trademarks*